US009964449B2

United States Patent
Durfee et al.

(10) Patent No.: US 9,964,449 B2
(45) Date of Patent: May 8, 2018

(54) INTERFEROMETER FOR SPATIAL CHIRP CHARACTERIZATION

(71) Applicant: Colorado School of Mines, Golden, CO (US)

(72) Inventors: Charles G. Durfee, Eldorado Springs, CO (US); Amanda K. Meier, Longmont, CO (US)

(73) Assignee: Colorado School of Mines, Golden, CO (US)

( * ) Notice: Subject to any disclaimer, the term of this patent is extended or adjusted under 35 U.S.C. 154(b) by 248 days.

(21) Appl. No.: 14/887,114

(22) Filed: Oct. 19, 2015

(65) Prior Publication Data

US 2016/0109298 A1 Apr. 21, 2016

Related U.S. Application Data

(60) Provisional application No. 62/065,528, filed on Oct. 17, 2014.

(51) Int. Cl.
| | |
|---|---|
| *G01J 11/00* | (2006.01) |
| *G02B 27/14* | (2006.01) |
| *G02B 5/122* | (2006.01) |
| *G01J 3/45* | (2006.01) |

(52) U.S. Cl.
CPC .............. *G01J 11/00* (2013.01); *G01J 3/45* (2013.01); *G02B 5/122* (2013.01); *G02B 27/149* (2013.01)

(58) Field of Classification Search
CPC ........... G01J 11/00; G01J 3/45; G02B 27/149; G02B 5/122
See application file for complete search history.

(56) References Cited

U.S. PATENT DOCUMENTS 4,504,147 A * 3/1985 Huang .................. G01J 9/0215
356/510
2014/0362376 A1 12/2014 Liu et al.

OTHER PUBLICATIONS

Akturk et al. "Measuring spatial chirp in ultrashort pulses using single-shot Frequency-Resolved Optical Gating," Optics Express, Jan. 2003, vol. 11, No. 1, pp. 68-78.
Austin "High-resolution Interferometric Diagnostics for Ultrashort Pulses," University of Oxford, 2010, 256 pages.
Durfee "Dispersion and Ultrashort Pulses," Colorado School of Mines, Feb. 2009, 37 pages [retrieved from: http://ticc.mines.edu/csm/wiki/images/f/f0/UFO05-Dispersion.pdf].

(Continued)

*Primary Examiner* — Hwa Lee
(74) *Attorney, Agent, or Firm* — Sheridan Ross P.C.

(57) ABSTRACT

Spectral interferometric systems and methods to characterize lateral and angular spatial chirp to optimize intensity localization in spatio-temporally focused ultrafast beams are described. Interference between two spatially sheared beams in an interferometer leads to straight fringes if the wavefronts are curved. To produce reference fringes, one arm relative to another is delayed in order to measure fringe rotation in the spatially resolved spectral interferogram. Utilizing Fourier analysis, frequency-resolved divergence is obtained. In another arrangement, one beam relative to the other is spatially flipped, which allows the frequency-dependent beamlet direction (angular spatial chirp) to be measured. Blocking one beam shows the spatial variation of the beamlet position with frequency (i.e., the lateral spatial chirp).

13 Claims, 8 Drawing Sheets

(56) References Cited

OTHER PUBLICATIONS

Fernandes "Analysis of spatio-temporal distortions in chirped pulse amplification lasers," Instituto Superior Tecnico, Universidade Tecnica de Lisboa, Nov. 2009, Dissertation to obtain master's Degree in Physical and Technological Engineering, 61 pages.
Gu et al. "Spatial chirp in ultrafast optics," Optics Communications, Dec. 2004, vol. 242, No. 4-6, pp. 599-604.
Li et al. "Propagation dependence of chirp in Gaussian pulses and beams due to angular dispersion," Optics Letters, Apr. 2009, vol. 34, No. 7, pp. 962-964.
Meier et al. "Broadband interferometric characterization of divergence and spatial chirp," Optics Letters, Sep. 2015, vol. 40, No. 17, pp. 4066-4069.
Osvay et al. "Angular Dispersion and Temporal Change of Femtosecond Pulses From Misaligned Pulse Compressors," IEEE Journal of Selected Topics in Quantum Electronics, Jan./Feb. 2004, vol. 10, No. 1, pp. 213-220.
Trebino "Measuring Ultrashort Laser pulses II: FROG," Instituto de Fisica de Sao Carlos universidade de Sao Paulo, 2012, 44 pages [retrieved from: http://www.fotonica.ifsc.usp.br/escola-jorge-swieca-2012/2%20FROG.pdf].
Trebino et al. "Measuring Everything You've Ever Wanted to Know About an Ultrashort Light Pulse," European Virtual University, 2008, 41 pages.
Trebino "Swamp Optics Tutorial: Spatio-temporal Distortions in Pulses," Swamp Optics, LLC, 2003, 4 pages.
Trebino et al. "Measuring everything you've always wanted to know about an ultrashort laser pulse (but were afraid to ask)," Georgia Tech School of Physics, 2007, 77 pages.

\* cited by examiner

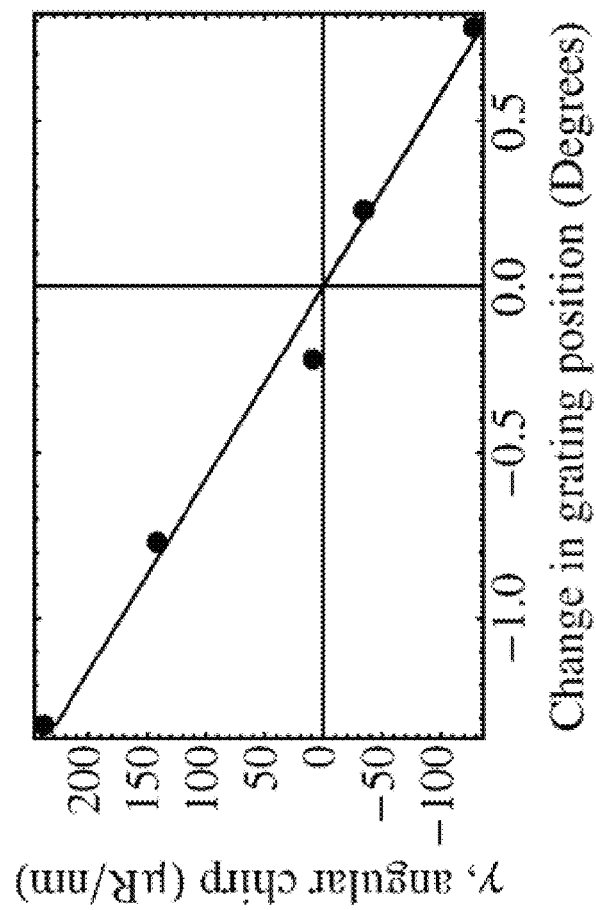
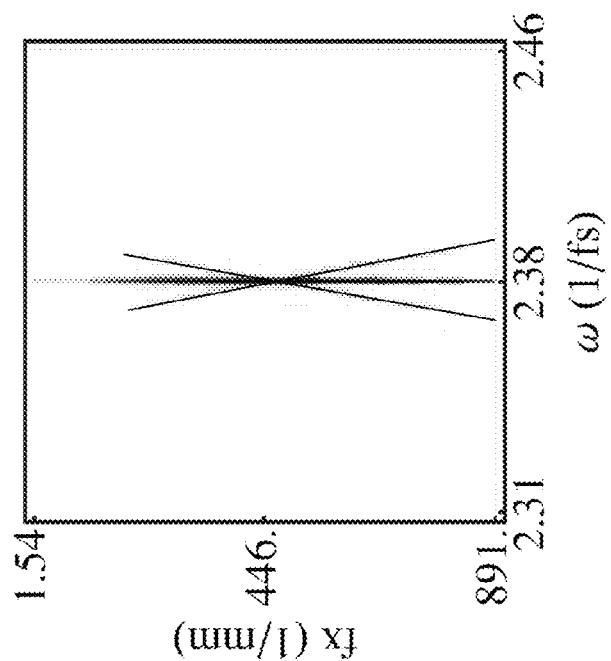
FIG. 6B
FIG. 6A

INTERFEROMETER FOR SPATIAL CHIRP CHARACTERIZATION

CROSS-REFERENCE TO RELATED APPLICATIONS

This Application claims the benefit of U.S. Provisional Application No. 62/065,528, filed Oct. 17, 2014, the entire disclosure of which is hereby incorporated herein by reference for all that it teaches and for all purposes.

This invention was supported, in part, using funds provided by the terms of FA9550-10-0394 and FA9550-10-0561 awarded by the Air Force Office of Scientific Research. The government has certain rights to this invention.

FIELD OF THE DISCLOSURE

The invention is related to a spectral interferometric method to characterize lateral and angular spatial chirp to optimize intensity-localization in spatio-temporally focused ultrafast beams.

BACKGROUND

As the use of ultrafast pulses has become more widespread in research and applications, the requirements and standards for control and characterization of the pulse and beam quality have become more stringent. Characterization of the temporal structure of pulses is well-developed with techniques such as frequency-resolved optical gating (FROG) and spectral phase interferometry for direct electric-field reconstruction (SPIDER). These techniques and their variants are typically used to characterize the amplitude and phase of pulses that have a pulse shape that does not depend on position within the beam. However, spatio-temporally coupled pulses cannot be written in a separable product form, such as $E(r,t)=f(r)g(t)$. Generally, in this case, there is an arbitrary variation in the pulse's structure with respect to position in the beam, which may result from a complicated nonlinear interaction such as filamentation.

In many cases, spatial chirp is an undesired (and often unrecognized) result of a misalignment in a chirped-pulse amplifier (CPA) system. An extension of the compressor alignment issue is grating tiling where multiple gratings are used in high-energy lasers instead of a large single grating. Angularly chirped beams can arise directly as the idler in non-collinear optical parametric amplifiers. Over the years, experiments have shown that spatial chirp and pulse front tilt can be exploited: traveling-wave pumping of X-ray lasers and pulse front matching in nonlinear optics and terahertz generation. More recently, systems have been developed to explicitly take advantage of the geometric second-order phase that results from angular chirp for temporal focusing. Accordingly, an increasing interest in exploiting the spatio-temporal qualities of these beams exists. Temporal focusing leads to axial sectioning in wide-field microscopy; simultaneous spatial and temporal focusing (SSTF) results in intensity localization useful in micro-machining and laser surgery. The pulse front tilt (PFT) that results from angular spatial chirp offers a means to control nonlinear conversion and is important in the phenomenon of nonreciprocal writing. Also, generation of attosecond pulses spatially separated in the far field can be obtained from the lighthouse effect, which utilizes rotation of the wavefront resulting from lateral chirp at the target. In these applications, understanding and controlling the nonlinear dynamics requires knowledge of the spatio-temporal characteristics of these ultrafast pulses.

Although general spatio-temporal characterization methods exist, such methods generally need a reference beam that is free of spatio-temporal distortion as well as the characterization of the input beam. Also, in such methods as STRIPED FISH, the spatial and spectral resolutions are limited by optics in the hologram design. Accordingly, improved characterization and control over a beam's spatio-temporal characteristics are needed in CPA and SSTF compressor systems.

SUMMARY

In accordance with embodiments of the present disclosure, spectral interferometric systems and methods to characterize lateral and angular spatial chirp are provided to optimize intensity localization in spatio-temporally focused ultrafast beams. An important restricted case of spatially chirped beams, in which the beam is composed of a spectrum of beamlets that are similar in shape (e.g., Gaussian beams) but may have a position or direction that varies with frequency, is addressed. In that spatial chirp is often an undesired result of misalignment in a chirped-pulse amplifier (CPA) system and an increased interest in exploiting the spatio-temporal qualities of these beams exists, understanding and controlling the nonlinear dynamics requires knowledge of the spatio-temporal characteristics of these ultrafast pulses.

There are two limiting cases that result in a beam with PFT. For a beam with transverse spatial chirp, an overall spectral chirp leads to a variation of the group delay with frequency, which in turn is mapped to position in the beam. Therefore, PFT can be adjusted by adjusting spectral chirp as in a chirped pulse amplification (CPA) system's stretcher or compressor. A second source of PFT is angular chirp that also leads to a second-order dispersion, so a pulse can be temporally focused with the right combination of spectral phase and angular chirp. Because of relative positioning of the beamlet focus and the frequency overlap, characterization of the divergence is also important. As previously mentioned, although general spatio-temporal characterization methods exist, such methods generally need a reference beam that is free of spatio-temporal distortion as well as the characterization of the input beam. In accordance with embodiments of the present disclosure, spatial chirp characterization utilizes a single input beam that is split and recombined to create the interferogram that is analyzed.

That is, in accordance with embodiments of the present disclosure, complete spatio-temporal characterization starts with measuring divergence and setting the divergence to zero if desired. Next, the angular chirp may be measured and finally a lens to measure transverse chirp may be added. The angular spatial chirp of the beams can then be analyzed as long as the beams are spatially flipped relative to each other. Accordingly, a set including a prism or pair of mirrors in a top arm and a corner cube or triplet of mirrors in a right arm is utilized. This setup yields an uneven number of bounces in the two arms and therefore spatially flips the beams relative to each other in the vertical direction. Further, such direction is set up to be the same direction as the spatial chirp and imaging spectrometer slit.

In accordance with at least one embodiment of the present disclosure, an optical system is provided that comprises: a first optical element or set of optical elements configured to receive a light beam having spatially chirped pulses of light and split the light beam into a first light beam and a second light beam; a second optical element or set of optical elements configured to receive the second light beam and provide an altered second light beam; and a third optical element or set of optical elements configured to receive the first light beam and spatially flip the first light beam with respect to the altered second light beam thereby providing an altered first light beam.

In accordance with at least some embodiments of the present disclosure, a method is provided, the method comprising: receiving a spatially chirped light beam; splitting the spatially chirped light beam into a first light beam and a second light beam; spatially flipping the first light beam with respect to the second light beam; combining the spatially flipped first light beam and an altered second light beam into a third light beam; and determining a measurement of spatial chirp based on an interference fringe pattern of the third light beam.

Further, in accordance with at least some embodiments of the present disclosure, an optical system for characterizing properties of a light beam is provided, the optical system comprising: a first interferometer arrangement including a first optical element or set of optical elements, a second optical element or set of optical elements, and a third optical element or set of optical element, wherein, the first optical element or set of optical elements is configured to receive a light beam having spatially chirped pulses of light and split the light beam into a first light beam and a second light beam, the second optical element or set of optical elements is configured to receive the first light beam and add a delay in time to the first light beam thereby providing an altered first light beam, the third optical element or set of optical elements is configured to receive the second light beam and provide an altered second light beam; a second interferometer arrangement including the first optical element or set of optical elements, a second optical element or set of optical elements, and the third optical element or set of optical element, wherein, the first optical element or set of optical elements is configured to receive the light beam having spatially chirped pulses of light and split the light beam into the first light beam and the second light beam, the third optical element or set of optical elements is configured to receive the second light beam and provide the altered second light beam, and the second optical element or set of optical elements is configured to receive the first light beam and spatially flip the first light beam with respect to the altered second light beam thereby providing a second altered first light beam; and an imaging spectrometer configured to generate an interferogram based on the altered second light beam and the second altered first light beam, wherein a measurement of spatial chirp based on an interference fringe pattern in the interferogram is generated.

The Summary is neither intended nor should it be construed as being representative of the full extent and scope of the present invention. The present disclosure is set forth in various levels of detail in the Summary, the attached drawings, and the detailed description of the disclosure and no limitation, as to the scope of the present disclosure, is intended by either the inclusion or non-inclusion of elements, components, etc. in the Summary. Additional aspects of the present disclosure will become more readily apparent from the detailed description, particularly when taken together with the drawings.

BRIEF DESCRIPTION OF THE DRAWINGS

The present disclosure is described in conjunction with the appended figures:

FIG. 6A depicts a Spatial Fourier transform of an interferometer arrangement of FIG. 5 with zero time delay where the sloping lines represent the variation of beam angle with frequency in accordance with embodiments of the present disclosure;

FIG. 6B depicts a variation of the angular chirp rate with angular adjustment of the second grating in a double-pass compressor (points) where the fit (line) may be used to determine the position wherein the gratings are parallel and the x axis, listed as change in grating angle, is for an arbitrary angle; accordingly, the zero angle does not correspond to the zero angle between gratings;

DETAILED DESCRIPTION

Figure 1:
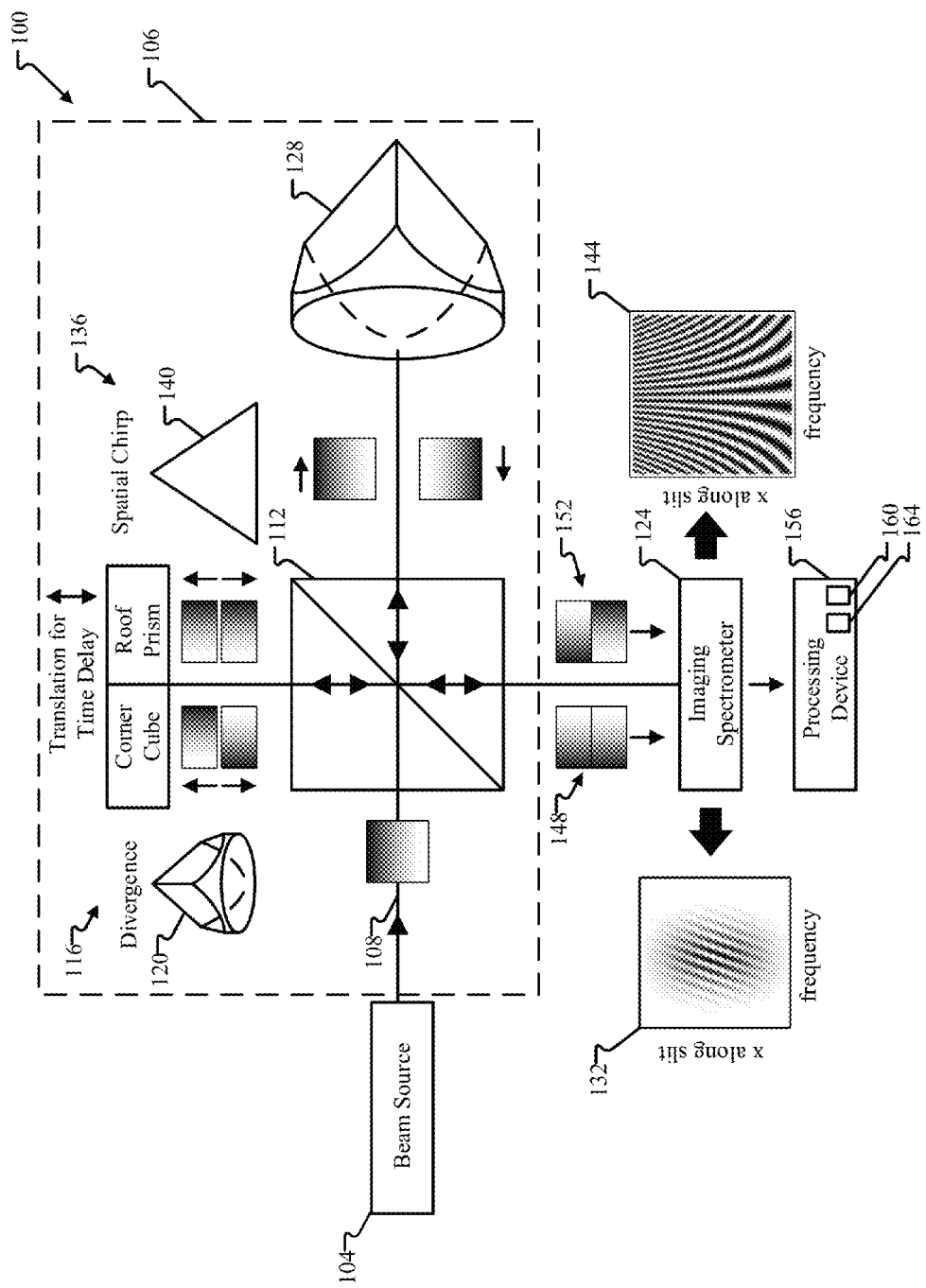
FIG. 1 is a schematic diagram depicting an optical system in accordance with embodiments of the present disclosure.

The ensuing description provides embodiments only, and is not intended to limit the scope, applicability, or configuration of the claims. Rather, the ensuing description will provide those skilled in the art with an enabling description for implementing the described embodiments. It being understood that various changes may be made in the function and arrangement of elements without departing from the spirit and scope of the appended claims.

In accordance with at least one embodiment of the present disclosure, an optical system 100 to characterize beams that are spatially chirped at the input, to an experiment for example, so that spatial chirp can either be eliminated or introduced in a controlled manner is described. That is, by introducing spatial chirp, each beamlet will share the same spatial characteristics, allowing much of the analysis to be treated analytically. For simplicity, a Gaussian form for each beamlet is utilized. The beam in the spatio-spectral domain may be written as Equation 1.

$$E(r, \omega) = E_0(\omega) \exp(ik \cdot r) \exp\left(-\frac{r_\perp^2}{w^2}\right) \exp\left(i\frac{\omega}{c}\frac{r_\perp^2}{2R}\right) \quad \text{Equation 1}$$

Here, $E_0(\omega) = A(\omega)\exp(i\varphi(\omega))$ is the complex spectral envelope, where $\varphi(\omega)$ is the overall spectral phase that might be controlled by the compressor or propagation through optical material. The angular chirp is encoded in the phase $k \cdot r = (\omega/c)(x \sin(\theta_x) + z \cos(\theta_x))$, where $\theta_x(\omega)$ describes the frequency-dependent angle. The coordinate representing the location of the maximum intensity of the beamlets, $r_\perp = [(x-x_s)^2 + y^2]^{1/2}$, is shifted in the x direction by $x_s(\omega)$. This lateral spatial chirp can be expressed either in terms of the lateral or the angular chirp rates, $\alpha$ or $\gamma$, respectively: $x_s(\omega) = \alpha(\omega - \omega_0)$ or $x_s(\omega) = f \tan(\theta_x(\omega))$ with $\theta_x(\omega) = \gamma(\omega - \omega_0)$. The local spot size $w(z, \omega)$ evolves with propagation as a Gaussian beam. It is important to note that $z=0$ represents the plate at which the beamlets cross and that the position(s) of the beamlet waists, in general, can be at some other z position. The last term in Equation 1 describes the evolution of the local radius of curvature $R(z, \omega)$, which, in general, could be frequency-dependent. The location of the $R=\infty$ plane coincides with that of the beamlet waist.

Because a uniform reference beam may not be available or may be difficult to create, two spectral interferometry (SI) techniques that are self-referenced are utilized. To measure the divergence, a spatial shear combined with spatially resolved SI is utilized. A prior approach consisted of adjusting the overlap, relative angle, and relative timing of the beams. However, in such an approach with zero time delay and a fixed crossing angle, precise crossing-angle calibration was required. In accordance with embodiments of the present disclosure, optics are utilized to avoid a crossing angle and time delay is utilized to provide the reference fringes, thereby eliminating the calibration step. Accordingly, the beam is not analyzed after the focusing optic, which can introduce aberrations. However, such an approach is well-suited to characterizing any corrections that might be introduced before focusing.

Angular chirp can be detected by adding an additional reflection in one interferometer arm to combine beams with relative spatial inversion. This inversion technique was used to perform nonlinear autocorrelation to measure PFT. A local measurement of the PFT does not provide sufficient information to predict the profile elsewhere: PFT cannot only arise from angular chirp $\theta_x(\omega)$ but may also arise from a combination of lateral chirp $x_s(\omega)$ and overall spectral phase $\varphi(\omega)$. In accordance with embodiments of the present disclosure, a linear measurement in the spectral domain measures angular chirp directly. In contrast with prior interferometric techniques, a Fourier inversion is utilized to obtain the frequency-dependent angular distribution. Moreover, as will be shown, the beamlet divergence affects the result of the angular chirp measurement because it combines spatial and angular shear.

In accordance with embodiments of the present disclosure, an optical system 100 for characterizing divergence and spatial chirp is provided. The optical system 100 may include a beam source 104, which generally provides an input light 108 as an input to a first optical element or a set of optical elements 106. The input light 108 may be a light beam and may be a spatially chirped light beam. The first optical element or set of optical elements 106 conditions the input light 104 and provides first and second output light 148 and 152 for analysis and characterization. In some embodiments, the first optical element or the first set of optical elements 106 may include one or more beam splitters 112, an optical element or set of optical elements 116 specific to divergence measurement, and an optical element or a set of optical elements 136 specific to analyzing angular and transverse chirp. The optical element, set of optical elements 116, and/or a first interferometric arrangement may comprise a top arm including a corner cube 120 and a right arm including a corner cube 128. The optical element, a set of optical elements 136, and/or a second interferometric arrangement may comprise a top arm including a prism, such as a roof prism 140, or a pair of mirrors and a right arm including a corner cube 128. The corner cube 128 may be shared; alternatively, or in addition, each right arm may include a different corner cube 128.

A beam with a spatial chirp evolves with propagation (e.g., angular chirp leads to lateral chirp). Any characterization must be performed at a well-defined plane to predict the form of the beam elsewhere in the system. In accordance with embodiments of the present disclosure, the path length to the measurement plane is the same for both configurations 116 and 136. Pulse characterization can be performed either before introducing spatial chirp or at a plane where all the frequency components are spatially overlapped. Autocorrelation has been performed at a spatio-temporal focus; single-pulse options include multiphoton intrapulse interference phase scan and recording the spectrum of the second harmonic as the chirp of the pulse is varied.

Although other techniques have been demonstrated for making spatial chirp measurements, techniques such as GRENOUILLE measures first-order lateral spatial chirp and pulse front tilt but does not characterize spatial wavefront. Having a well-characterized reference beam allows for the measurement of arbitrary spatio-temporal couplings. Multi-shot scanning examples are fiber-based SI, gated angular spectrum, and spatially resolved SPIDER. Examples of single-shot referenced measurements are STRIPED-FISH and spatially resolved SI.

As previously mentioned, the two interferometric arrangements utilized are shown schematically in FIG. 1. The first interferometric arrangement has two corner cubes to produce two output beams with lateral ($\delta x$) and temporal shear ($\tau$) and is used to measure the beam divergence. The second interferometric arrangement replaces one of the corner cubes with an optical element, such as a roof prism 140, to spatially invert one beam, so that, if $\gamma \neq 0$, spatial interference of the spectral components can occur to characterize the angular chirp. In both cases, the output is directed into an imaging spectrometer 124, which samples the beams across a line at y=0. Such an imaging spectrometer 124 may include an imaging element to perform such sampling. Relative time delay is utilized to allow the phase to be extracted with the Fourier analysis, as described below. Complete spatio-spectral characterization starts with measuring divergence utilizing the first interferometer arrangement and setting to zero, if desired. The second interferometer arrangement most accurately measures angular chirp. Note that lateral chirp can be converted to angular chirp by placing a long focal length lens one focal length in front of the entrance slit of the imaging spectrometer 124. Further processing of the resulting interferogram may be performed at the processing device 156 having processor 160 and memory 164. Alternatively, or in addition, the processing device 156, processor 160, and/or memory 164, alone or in combination, may be incorporated into the imaging spectrometer 124.

Figure 2:
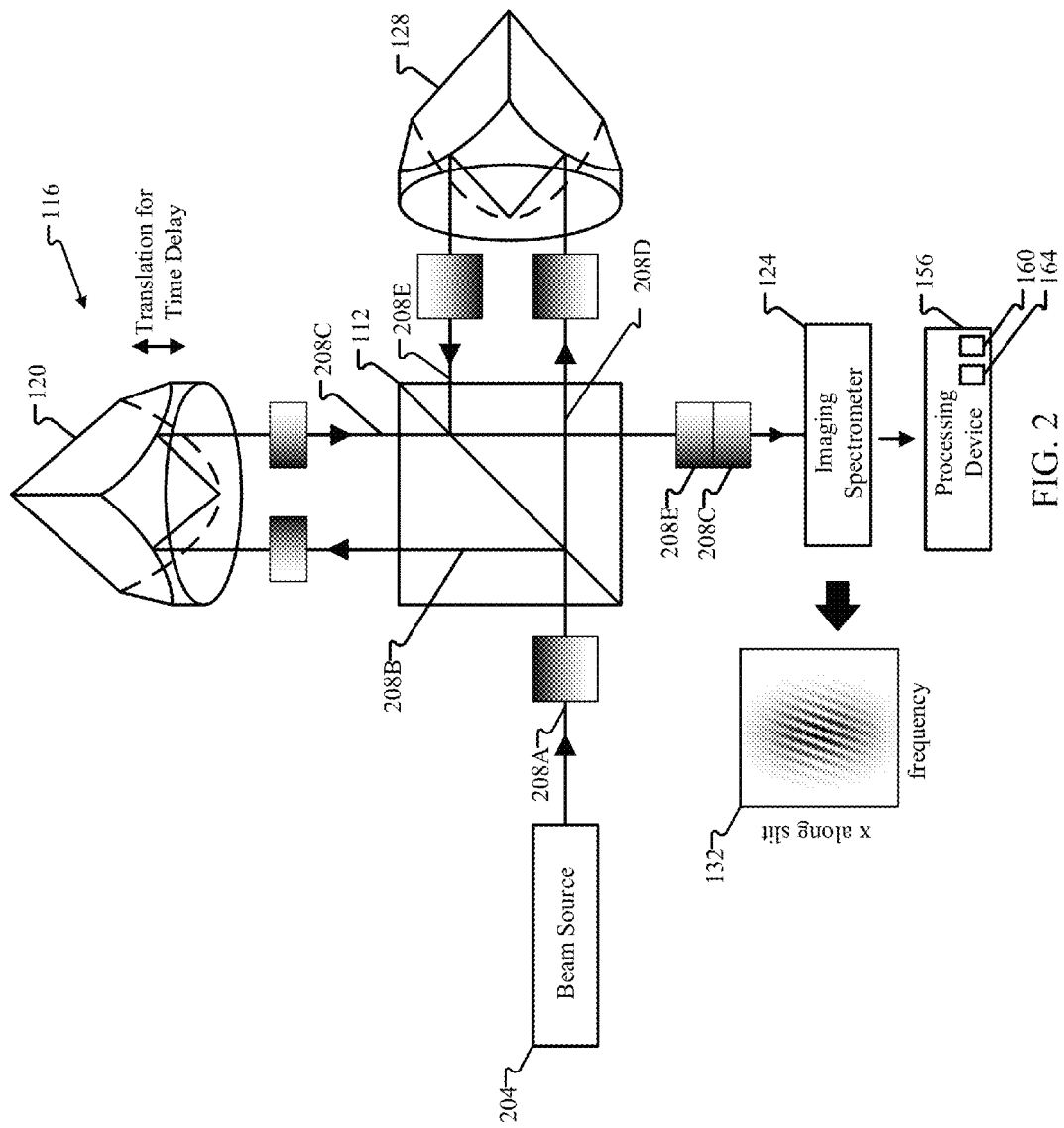
FIG. 2 is a schematic diagram depicting additional details of an optical system in a accordance with embodiments of the present disclosure.

A detailed schematic of the first interferometric arrangement is illustrated in FIG. 2. As previously mentioned, a beam source 204 generally provides an input light 208A as an input to a first optical element or a set of optical elements 106 comprising the first interferometric arrangement. The first interferometric arrangement includes two corner cubes 120 and 128 to produce two output beams with lateral ($\delta x$) and temporal shear ($\tau$) and is used to measure the beam divergence. That is, the input light 208A is split at the beam splitter 112 resulting in input light 208B and input light 208D. Input light 208B is directed to the top arm including the corner cube 120 and results in conditioned input light 208C. Input light 208D is directed to the right arm including the corner cube 128 and resulted in conditioned input light 208E. Conditioned input light 208C and conditioned input light 208E may then be combined or otherwise made to overlap, using the beam splitter 112 and/or another optical element, such that the conditioned input light 208C and conditioned input light 208E are directed into the imaging spectrometer 124.

Measurement of divergence occurs using the first interferometric arrangement, such as the interferometric arrangement depicted in FIG. 2. Such an arrangement, is a spectrally resolved variation of a shearing interferometer to provide a divergence interferogram 132. The glass shear plate or the air-edge interferometers, which are not spectrally resolved, have limited application for ultrashort pulses. With spectral resolution, the temporal offset ($\tau$) may be used to produce reference fringes in x–$\omega$ space. As a side note, a variant of the cyclic or Sagnac shearing interferometer has been previously utilized in such a configuration. The variant of the cyclic or Sagnac shearing interferometer can be adjusted to produce spatial and temporal shear; however, the corner-cube design allows decoupled adjustment of both shears and an easy change to the spatially inverted configuration of the second interferometric arrangement. The output intensity measured at the spectrometer 124 is provided according to Equation 2.

$$I(x,\omega) = \propto |E(x+\delta x,\omega)\exp(i\omega\tau) + E(x-\delta x,\omega)\exp(-i\omega\tau)|^2 \quad \text{Equation 2}$$

The full spatial and temporal shifts are $2\delta x$ and $2\tau 2$, respectively. The interferogram 132 is insensitive to the overall spectral phase $\varphi(\omega)$ and the angular chirp $\theta_x(\omega)$. When Equation 1 and Equation 2 are combined and reduced, the interferogram becomes Equation 3.

$$I(x,\omega) = |A(x,\omega)|^2 \left(2 + e^{i2\omega\left(\frac{1\delta x}{cR}x + \tau\right)} + e^{-i2\omega\left(\frac{1\delta x}{cR}x + \tau\right)}\right) \quad \text{Equation 3}$$

Figure 3:
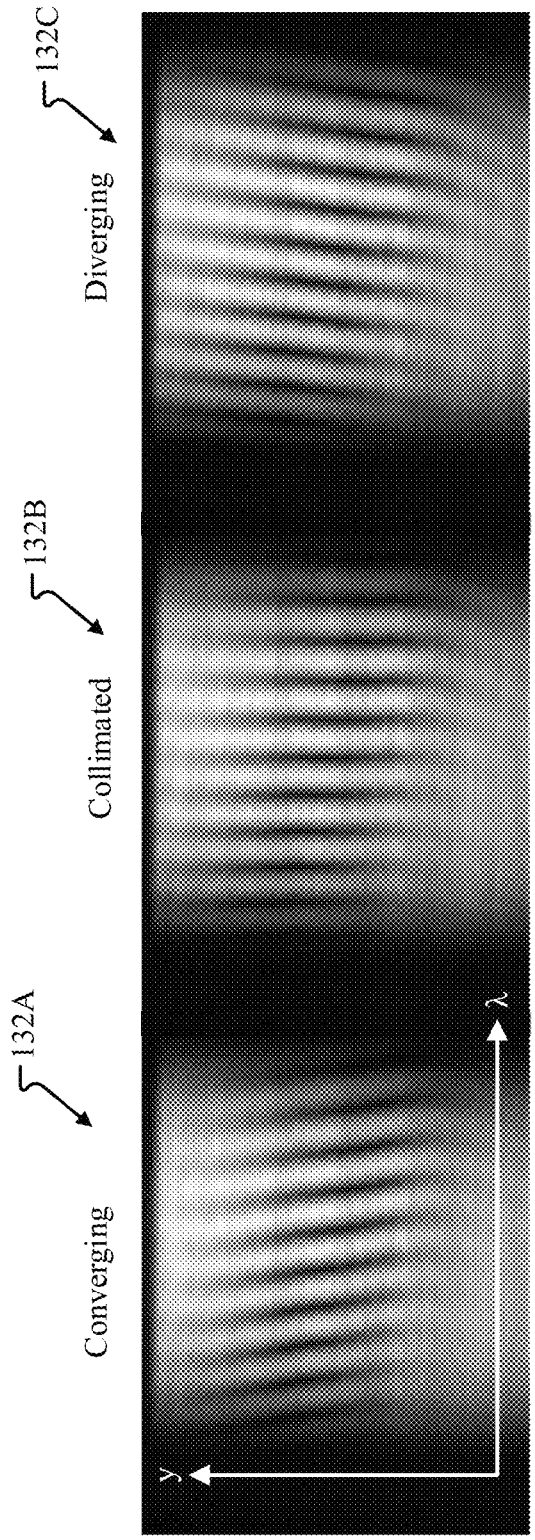
FIG. 3 depicts a rotation of a fringe pattern resulting from beam divergence in accordance with embodiments of the present disclosure.

The addition of time delay provides reference fringes so that the fringes rotate in x–$\omega$ space as the divergence is changed. As further illustrated in FIG. 3, a converging beam will rotate the fringes counterclockwise (e.g., interferogram 132A), a diverging beam clockwise (e.g., interferogram 132C), and vertical fringes indicate a collimated beam (e.g. interferogram 132B).

As a means to test the divergence measurement, a beam from a Ti:sapphire oscillator was passed through a spatial filter and recollimated with a nominal f=200 mm lens placed on a translation stage to vary the beam divergence. The fringe contrast decreases where the beams were not well overlapped spatially.

Rather than tracking the fringes for direct fringe rotation measurement, process the interferogram 132 was processed using Fourier analysis. The image is inverse-Fourier transformed in the spectral direction. An AC peak is selected with a mask and re-centered on the grid. Fourier-transforming back to the spectral domain, the complex second term in Equation 3 is obtained. For each frequency component in the spectrum, the phase was fitted to a line in the x-direction and the slope for each frequency component was divided by the local value of $2\omega/c$ to yield the quantity sin $\theta_c$, where $\theta_c$ is the local angle between wavefronts. The two crossing wavefronts depend on the beam radius of curvature and the spatial shear between the beams, sin $\theta_c = \delta x/R$. The shear axis then measured by placing a lens in front of the interferometer to focus the input beam to the entrance slit. The distance between the two resulting spots is equal to $2\delta x$. From the angle between the wavefronts and the spatial shear, R is calculated, which in general, is a function of $\omega$; in the present case, however, all spectral components were averaged for a better signal-to-noise ratio.

Figure 4:
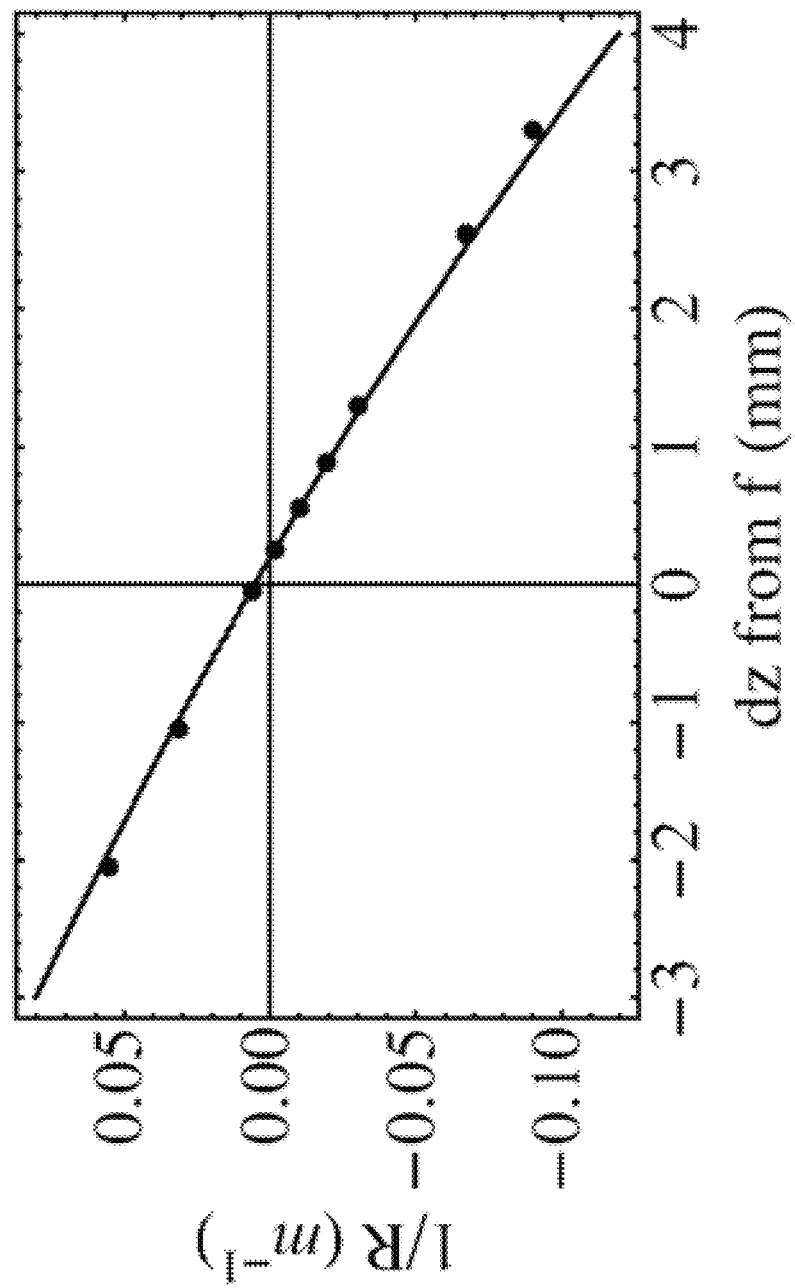
FIG. 4 is a chart depicting the inverse radius of curvature versus change in lens position δz (points) and a fit line providing slope to extract a focal length of a lens in accordance with embodiments of the present disclosure.

Such a measurement was made for several positions ($\delta z$) of the collimating lens and the data points were plotted with a Gaussian propagation fit (see FIG. 4) according to a measured distance between the lens and spectrometer slit of 132 cm, a focal beam radius of 25 µm, and the fitted focal length of the lens is 18.95 cm. The percent difference between this is measured then the focal length is extracted and the focal length is calculated, according to the lens maker's equation (18.01 cm), which results in 5.2%. As previously discussed, further processing of the interferogram may be performed at the processing device 156 having processor 160 and memory 164. Alternatively, or in addition, the processing device 156, processor 160, and/or memory 164, alone or in combination, may be incorporated into the imaging spectrometer 124.

Figure 5:
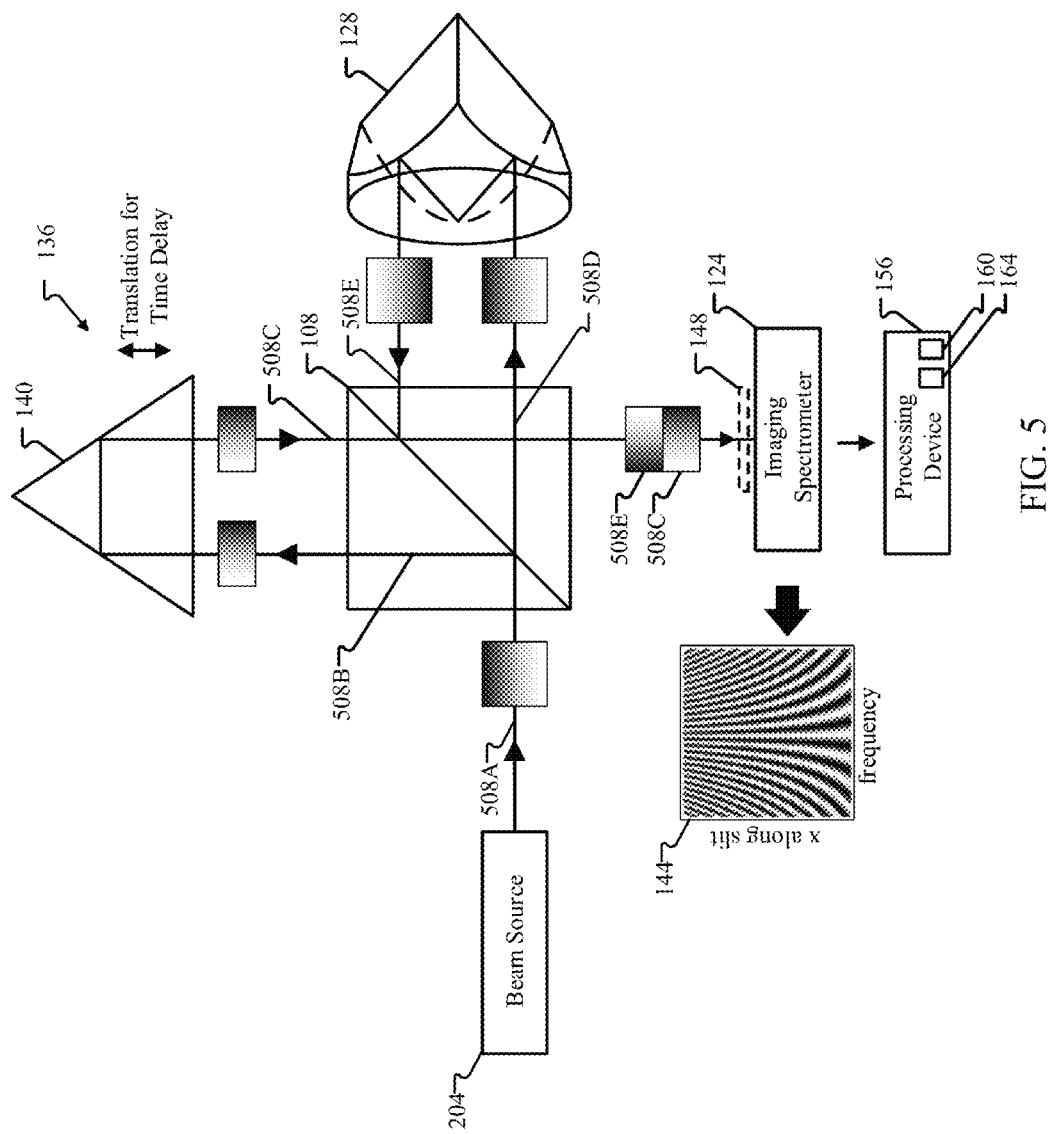
FIG. 5 is a schematic diagram depicting additional details of an optical system in a accordance with embodiments of the present disclosure.

A detailed schematic of the second interferometric arrangement is illustrated in FIG. 5. As previously mentioned, a beam source 204 generally provides an input light 508A as an input to a first optical element or a set of optical elements 106 comprising the second interferometric arrangement. The second interferometric arrangement includes a prism or pair of mirrors, such as roof prism 140, in the top arm and a corner cube 128, or a triplet of mirror, in the right arm, yielding an uneven number of bounces in the two arms and therefore spatially flipping the beams relative to each other in the vertical direction. That is, the input light 508A is split at the beam splitter 112 resulting in input light 508B and input light 508D. Input light 508B is directed to the top arm including the roof prism 140 for example, and results in conditioned input light 508C. Input light 508D is directed to the right arm including the corner cube 128 and resulted in conditioned input light 508E. Conditioned input light 508C and conditioned input light 508E may then be combined or otherwise made to overlap, using the beam splitter 112 and/or another optical element, such that the conditioned input light 508C and conditioned input light 508E are directed into the imaging spectrometer 124.

For the measurement of spatial chirp with the second interferometer arrangement, the beams are inverted along the x-direction without spatial shear:

$$I(x,\omega) = |E(x,\omega)\exp(i\omega\tau) + E(-x,\omega)\exp(-i\omega\tau)|^2 \quad \text{Equation 4}$$

When there is no lateral spatial chirp, the resulting spatial chirp interferogram (e.g. 144) is insensitive to both $\varphi(\omega)$ and $R(\omega)$. This results in an interferogram 144 that is similar to Equation 3, but instead of the constant local crossing angle sin $\theta_c = \delta x/R$, there is the frequency dependent angle, sin $\theta_x = (\omega)$.

Three tests varying the amount of spatial chirp were performed; a large angular chirp from a single transmission grating, a small spatial chirp from a detuned CPA grating compressor, and a large lateral spatial chirp from a SSTF single-pass compressor. For the first test of the angular chirp, a 110 grooves/mm transmission diffraction grating was imaged with unit magnification through the interferometer to the spectrometer entrance slit, thereby overlapping all spectral components there. The fringe curvature seen in the interferogram 144 results from the nonlinear term (quadratic for a linear chirp rate) in the interferogram 144. Fourier transforming the interferogram 144 in each direction results in a central DC peak and two crossed lines as depicted in FIG. 6A. Transforming in the spectral direction provides an angled line that represents the pulse front tilt I(x,τ). Transforming instead in the spatial direction as shown gives a line representing the angular chirp I($f_x$,ω), where $f_x$=(sin $θ_x$)/λ. To use the Fourier processing outlined above, time delay was added between the beams to fully separate the interference terms from the central amplitude term. The delay should satisfy ($τ_{eff}$(x)=2/c sin($θ_x$)x+τ) to achieve sufficient separation. For such a measurement of the angular chirp with the transmission grating, a value of 203 μrad/nm was obtained, which is in excellent agreement with the expected value of 205 μrad/nm. As previously discussed, further processing of the interferogram may be performed at the processing device 156 having processor 160 and memory 164. Alternatively, or in addition, the processing device 156, processor 160, and/or memory 164, alone or in combination, may be incorporated into the imaging spectrometer 124.

To test the sensitivity of the angular chirp measurement, the output of a double-pass grating compressor was directed into the interferometer. The angular chirp for several angular settings of the second diffraction grating (in combination with the retroflection roof mirror in the compressor) was then measured. FIG. 6B shows the measured angular chirp rate as a function of this grating angle, as shown in Equation 5.

$$\frac{dθ}{dω} = -\frac{Δθ_2}{d}\frac{\tan[θ_d]}{\cos[θ_i]} \quad \text{Equation 5}$$

$Δθ_2$ is the movement of grating 2 from parallelism to grating 1, θd is the diffracted angle off the second grating, and $θ_d$ is the incident angle on the first grating. The data can be fitted to this line to find the optimum grating angle for zero spatial chirp. The grating compressor was set to that angle position and a final interferogram was obtained to confirm zero chirp. The result was an extremely small 0.014 μrad/nm of angular spatial chirp. As depicted, one of the points in FIG. 6B resides off the fitted line: for this point, the slope is close to zero, and the variations in the curve are consistent with imperfections found in the λ/4 per in. surface figure of the interferometer optics (leading to variations of about ±10 μrad/nm). Better surface figure optics as well as interferometric grade tolerance of the roof and corner reflectors will increase the precision and accuracy of the measurement.

The final test was to characterize a single-pass grating compressor used to prepare the beam for SSTF. Two 1200 grooves/mm gratings were placed approximately 130 mm apart. A strong lateral spatial chirp in this case is seen in the variation of the central position of the intensity with wavelength. The lateral chirp was measured without interference by finding the spatial centroid of intensity versus wavelength shown in FIG. 7A. The lateral spatial chirp was transformed to angular chirp by placing a lens 148 in front of the interferometer. With the spectrometer entrance slit at the focal plane, the lateral to angular chirp conversion with a lens can be expressed as Equation 6.

$$\frac{dθ}{dω} = \frac{1}{f}\frac{dx_1}{dω} \quad \text{Equation 6}$$

Figures 7A, 7B:
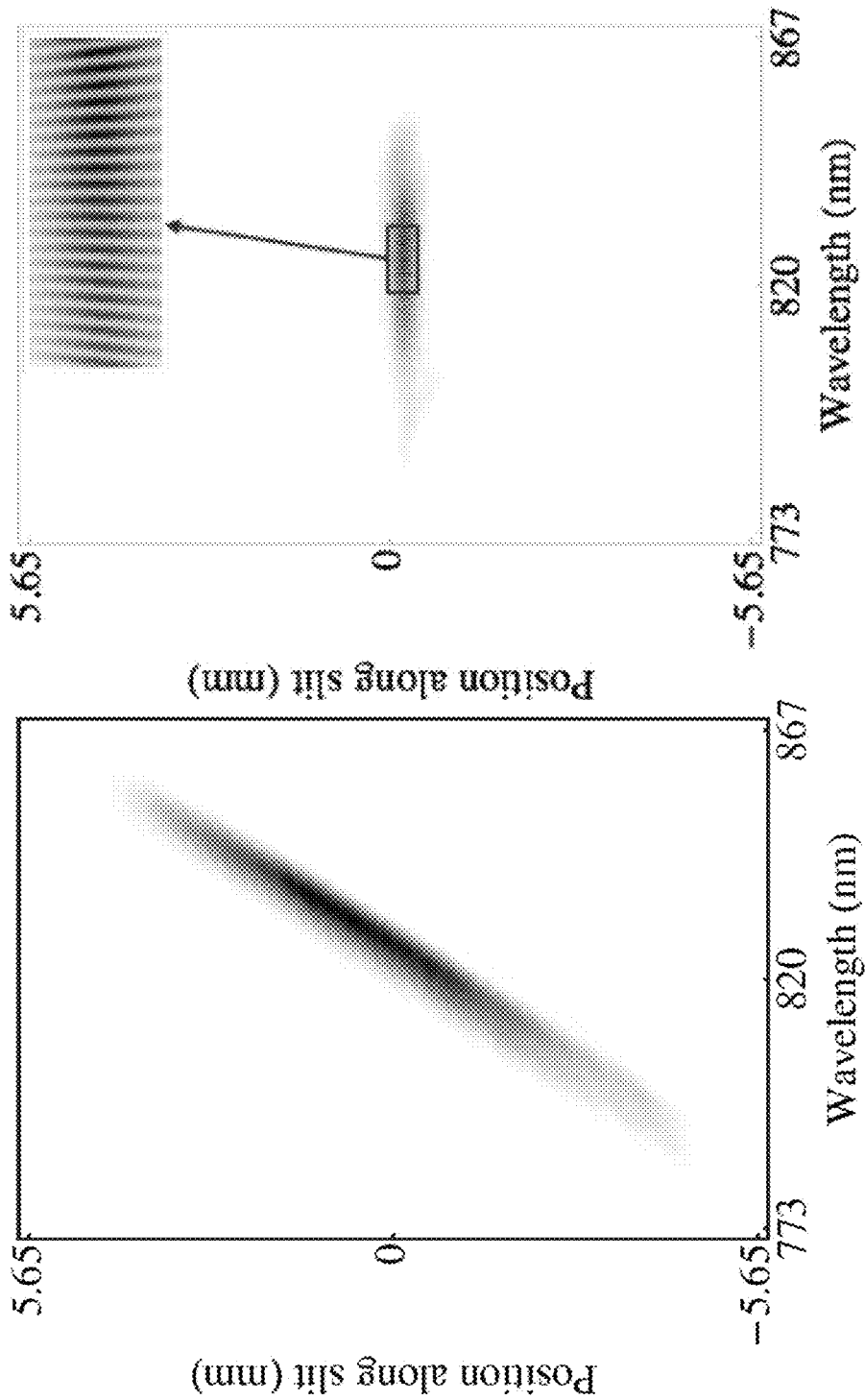
FIG. 7A depicts a lateral spatial chirp from an SSTF compressor in accordance with embodiments of the present disclosure.
FIG. 7B depicts a lens conversion from lateral to angular spatial chirp with magnification to see such fringe curvature in accordance with embodiments of the present disclosure.

With regard to Equation 6, f is the focal length of the lens, dθ/dω is the angular chirp rate (γ), and $dx_1$/dω is the lateral chirp rate (α). If the input beam to the single-pass compressor is collimated, the spectral components will overlap with no tilt to the intensity envelope in the (λ,x) camera plane. The angular chirp can be measured by analyzing the interferogram, as shown in FIG. 7B. A spectrometer grating groove density higher than the one used (300 groove/mm) would allow a larger time delay to be used, giving better separation of the modulation peak from the zero-frequency peak. Both the extracted lateral chirp rate (220; 576 mm/nm) and the lateral chirp rate converted from measured angular chirp rate (220; 565 mm/nm) compare well with the grating compressor analytical model spatial chirp rate (220; 451 mm/nm).

In the general case, where there is input divergence, there is a frequency-dependent spatial shear, which couples the measured wavefront angles and the lateral spatial chirp. In this case, the local angle versus frequency plots for spatially chirped beam have the following slope: m=−2(α/R+γ). In the simplest case, the input beam can be set to have no divergence so the lateral spatial chirp in this limit does not matter and a pure angular spatial chirp can be obtained. Or, instead, the divergence using the first interferometer arrangement can be measured and the combination of lateral and angular chirp from the slope can be extracted. Furthermore, the crossing plane of the beamlets can be forced to be at the beam waist with the following condition on the radius of curvature in relation to the angular and lateral chirp rates, 1/R=λ/α.

Figure 8:
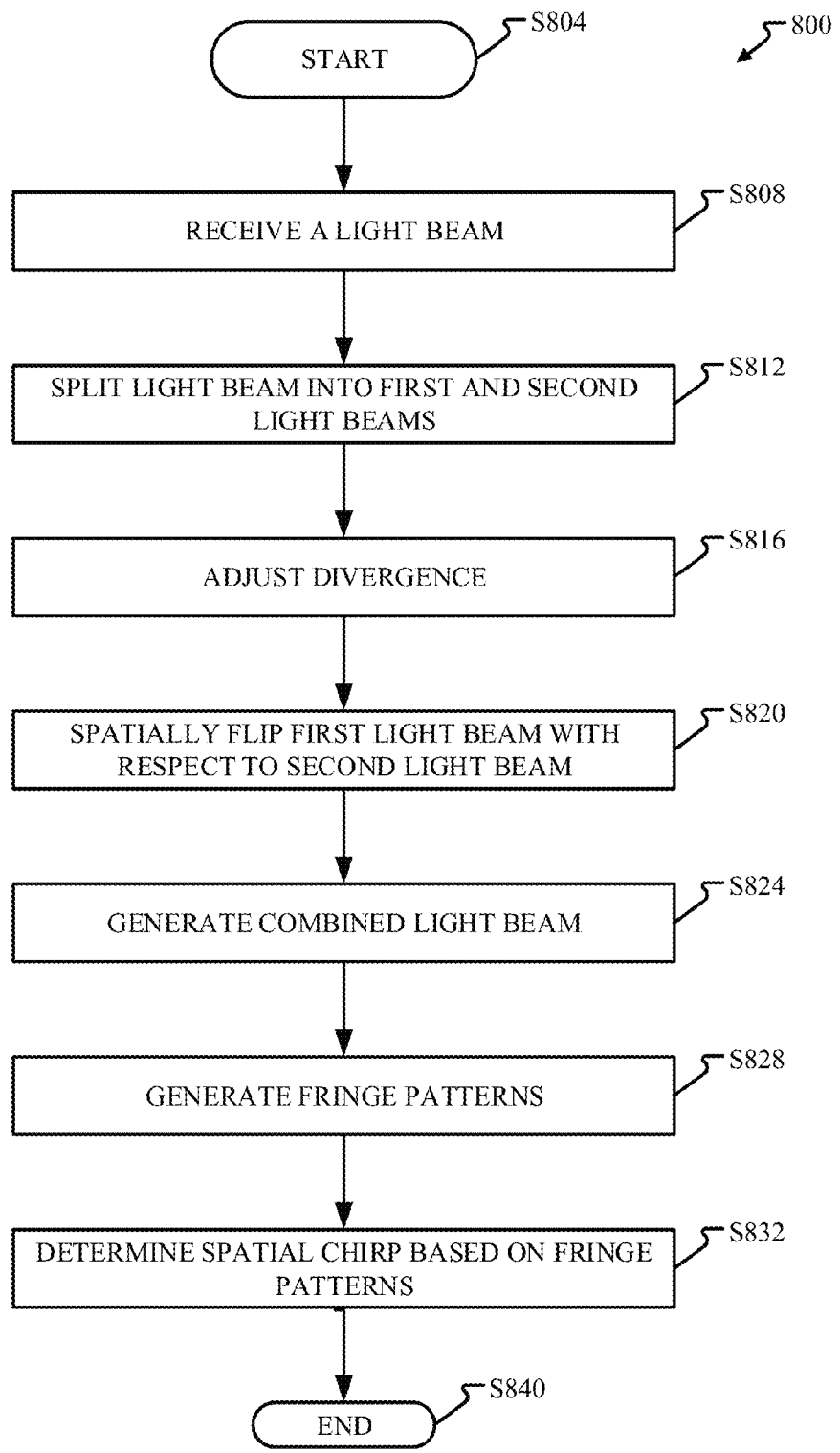
FIG. 8 depicts a method in accordance with embodiments of the present disclosure.

Referring now to FIG. 8, a method 800 to characterize spatial chirp will be described in accordance with embodiments of the present disclosure. Method 800 generally begins at step S804, where a light beam is provided to an optical system, such as optical system 100 previously described. Such light beam may be received at step S808, where the light beam encounters a beam splitter, such as beam splitter 112, resulting in first and second light beams. Divergence may then be adjusted at step S812 utilizing a first interferometric arrangement, such as the first interferometric arrangement described in FIGS. 1 and 2. Step S816 may be an optional step. At step S820, the first light beam is spatially flipped with respect to the second light. For example, a second interferometric arrangement, such as the second interferometric arrangement described in FIGS. 1 and 5 may be utilized. The light beams may then be combined at step S824 and one or more fringe patterns may be generated at step S828 utilizing an imaging spectrometer 124 for example. The one or more fringe patterns may be generated in a manner as previously described. At step S832, spatial chirp may be determined based on the one or more fringe patterns as previously described. For instance, the interferogram may be Fourier transformed and spatial chirp may be determined as previously described. Method 800 may end at step S840.

As provided herein, a series of interferometric measurements that can determine several parameters (angular and lateral spatial chirp, beam divergence), which are required to characterize and align spatially chirped optical systems have been described. In principle, the spectrally resolved spatial shear measurement may provide higher-order wavefront information, such as coma or spherical aberration. Further, the measurements in several setups have been tested and are in good agreement with predicted results. Such a system generally finds use in the alignment of spatially chirped ultrafast systems as well as in more conventional chirped pulse amplification compressors.

Specific details were given in the description to provide a thorough understanding of the embodiments. However, it will be understood by one of ordinary skill in the art that the embodiments may be practiced without these specific details.

While illustrative embodiments of the disclosure have been described in detail herein, it is to be understood that the inventive concepts may be otherwise variously embodied and employed, and that the appended claims are intended to be construed to include such variations, except as limited by the prior art.

What is claimed is:

1. An optical system comprising:
    a first optical element or set of optical elements configured to receive a light beam having spatially chirped pulses of light and split the light beam into a first light beam and a second light beam;
    a second optical element or set of optical elements configured to receive the second light beam and provide an altered second light beam;
    a third optical element or set of optical elements configured to receive the first light beam and spatially flip the first light beam with respect to the altered second light beam thereby providing an altered first light beam; and
    an imaging spectrometer configured to generate an interferogram based on the altered second light beam and the altered first light beam.

2. The optical system of claim 1, further comprising a fourth optical element or set of optical elements configured to combine the altered first light beam and the altered second light beam into a third light beam, wherein the interferogram is based on the third light beam.

3. The optical system of claim 1, wherein the first optical element is configured to combine the altered first light beam and the altered second light beam into a third light beam, wherein the interferogram is based on the third light beam.

4. The optical system of claim 1, further comprising a fourth optical element or set of optical elements configured to receive the first light beam, provide a second altered first light beam, and vary a divergence of a fourth light beam resulting from the combination of the second altered first light beam and the altered second light beam.

5. The optical system of claim 4, wherein the fourth optical element or set of optical elements is configured to add a time delay to the first light beam.

6. The optical system of claim 4, wherein the fourth optical element or set of optical elements is mounted to a translational stage.

7. The optical system of claim 4, wherein the first light beam is received at either (i) the third optical element or set of optical elements or (ii) the fourth optical elements or set of optical elements at any one time.

8. The optical system of claim 7, wherein the imaging spectrometer is configured to generate a second interferogram based on combination of the second altered first light beam and the altered second light beam, wherein the second altered first light beam is received from the fourth optical element or set of optical elements.

9. The optical system of claim 8, wherein the second interferogram depicts one or more vertical fringe patterns.

10. The optical system of claim 1, wherein the first optical element or set of optical elements include a beam splitter, the second optical element or set of optical elements include a corner cube, and the third optical element or set of optical elements includes a prism.

11. The optical system of claim 10, further comprising a fourth optical element or set of optical elements configured to vary a divergence of a third light beam resulting from a combination of a second altered first light beam and the altered second light beam, wherein the fourth optical element or set of optical elements includes a corner cube.

12. The optical system of claim 11, further comprising a lens in an optical path of the third light beam, wherein the lens is located between the third optical element or set of optical elements and the imaging spectrometer.

13. An optical system for characterizing properties of a light beam, the system comprising:
    a first interferometer arrangement including a first optical element or set of optical elements, a second optical element or set of optical elements, and a third optical element or set of optical element,
    wherein,
        the first optical element or set of optical elements is configured to receive a light beam having spatially chirped pulses of light and split the light beam into a first light beam and a second light beam,
        the second optical element or set of optical elements is configured to receive the first light beam and add a delay in time to the first light beam thereby providing an altered first light beam,
        the third optical element or set of optical elements is configured to receive the second light beam and provide an altered second light beam;
    a second interferometer arrangement including the first optical element or set of optical elements, a second optical element or set of optical elements, and the third optical element or set of optical element,
    wherein,
        the first optical element or set of optical elements is configured to receive the light beam having spatially chirped pulses of light and split the light beam into the first light beam and the second light beam,
        the third optical element or set of optical elements is configured to receive the second light beam and provide the altered second light beam, and
        the second optical element or set of optical elements is configured to receive the first light beam and spatially flip the first light beam with respect to the altered second light beam thereby providing a second altered first light beam; and
    an imaging spectrometer configured to generate an interferogram based on the altered second light beam and the second altered first light beam, wherein a measurement of spatial chirp based on an interference fringe pattern in the interferogram is generated.

* * * * *